United States Patent
Wigström et al.

(10) Patent No.: US 9,527,476 B2
(45) Date of Patent: Dec. 27, 2016

(54) BELT RETRACTOR WITH A SWITCHABLE FORCE-LIMITING DEVICE

(71) Applicant: Autoliv Development AB, Vårgårda (SE)

(72) Inventors: Fredrik Wigström, Göteborg (SE); Elias Mathiasson, Alingsas (SE); Erik Rydsmo, Sollebrunn (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 138 days.

(21) Appl. No.: 14/421,590

(22) PCT Filed: Aug. 12, 2013

(86) PCT No.: PCT/EP2013/002413
§ 371 (c)(1),
(2) Date: Feb. 13, 2015

(87) PCT Pub. No.: WO2014/026757
PCT Pub. Date: Feb. 20, 2014

(65) Prior Publication Data
US 2015/0298649 A1    Oct. 22, 2015

(30) Foreign Application Priority Data
Aug. 17, 2012  (DE) .................. 10 2012 107 557

(51) Int. Cl.
*B60R 22/41*  (2006.01)
*B60R 22/34*  (2006.01)
*B60R 22/28*  (2006.01)

(52) U.S. Cl.
CPC ........... *B60R 22/41* (2013.01); *B60R 22/3413* (2013.01); *B60R 2022/287* (2013.01); *B60R 2022/288* (2013.01)

(58) Field of Classification Search
CPC ............... B60R 22/341; B60R 22/4676; B60R 2202/287; B60R 2202/288
See application file for complete search history.

(56) References Cited

U.S. PATENT DOCUMENTS

2007/0075173 A1    4/2007  Boelstler et al.
2012/0074253 A1*   3/2012  Dahlquist ........... B60R 22/3413
                                                    242/384.7
2014/0203620 A1*   7/2014  Hiramatsu .......... B60R 22/4676
                                                    297/475

FOREIGN PATENT DOCUMENTS

DE        103 07 430 B3    7/2004
DE    10 2009 024 292 A1  12/2010

OTHER PUBLICATIONS

PCT International Search Report—Nov. 5, 2013.
German Examination Report—Apr. 15, 2013.

* cited by examiner

*Primary Examiner* — Sang Kim
(74) *Attorney, Agent, or Firm* — Brinks Gilson & Lione

(57) ABSTRACT

A vehicle seat belt retractor with a belt shaft (10) and a coupled profile head lockable to a housing. A force-limiting device has at least two elements (11, 12) between profile head and belt shaft (10). Free ends (15, 16) of the force-limiting elements (11, 12) are coupled to each other by a connecting tube (13) via a coupling element (18). The coupling element (18) has a hook-shaped spring element with a locking hook (19) which slides over the connecting tube (13) when the belt shaft (10) rotates and engages in a locking groove (20) to couple the connecting tube (13) to the belt shaft (10). At a preset angle of rotation of the belt shaft (10) is reached, the bridging device releases the coupling element (18) for the locking hook (19) to latch into the connecting tube locking groove (20).

10 Claims, 4 Drawing Sheets

BELT RETRACTOR WITH A SWITCHABLE FORCE-LIMITING DEVICE

CROSS REFERENCE TO RELATED APPLICATIONS

This application claims priority to German Patent Application No. 10 2012 107 557.3, filed on Aug. 17, 2012 and PCT International Patent Application No. PCT/EP2013/002413, filed on Aug. 12, 2013.

FIELD OF THE INVENTION

The invention relates to a belt retractor for the seat belt of a motor vehicle with a belt shaft that is rotatably mounted in a housing frame and with a profile head that is coupled to the belt shaft and is lockable with respect to the housing frame, wherein a force limiting device consisting of at least two force limiting elements is arranged between the profile head and the belt shaft to allow a force limited rotation of the belt shaft in the direction of the seat belt extension when the profile head is locked. When a force limiting level preset by the force limiting device is exceeded, and a force limiting element is connected by one end to the profile head, and a second force limiting element is connected by one end to the belt shaft, and wherein the two free ends of the first force limiting element and second force limiting element are coupled to one another by means of a connecting tube, and in order to couple the connecting tube to the belt shaft, a coupling element is provided, by means of which the connecting tube can be coupled according to a preset angle of rotation of the belt shaft to said belt shaft, and wherein, the coupling element arranged between the belt shaft and the connecting tube is furthermore configured as a hook-shaped spring element with a locking hook that slides over the outer periphery of the connecting tube during rotation of the belt shaft including the coupling element and, when the preset angle of rotation of the belt shaft is reached, drops into a locking groove formed on the periphery of the connecting tube, and thus couples the connecting tube to the belt shaft.

BACKGROUND

A belt retractor with the features mentioned above has been described in document DE 10 2009 024 292 AI. Since the two-stage force limiting device consists of two torsion bars arranged in the interior of the belt shaft of the belt retractor and are coupled to one another by means of a connecting tube, each having a different force limiting level, the connecting tube is coupled to the belt shaft via a separate coupling element. If the associated profile head is locked to the housing frame accommodating the belt shaft, the force limiting device allows a further force-limited rotation of the belt shaft in the belt extension direction with respect to the locked profile head during an increase in the belt force caused by a forward displacement of the belted passenger after a preset force limiting level has been exceeded. In order to configure the two-stage force limitation, a first torsion bar having a high force limiting level is firmly connected by one end to the profile head, while its other end is connected to the connecting tube enclosing it; the second torsion bar, arranged in a line with the first torsion bar, and having a lower force limitation level, is connected by its one end to the connecting tube and by its other end to the belt shaft. Since at the beginning of the force limitation, only the low force limitation level should be enabled, the connecting tube connecting the two torsion bars to one another is not yet connected to the belt shaft, so that the other end of the second torsion bar having the lower force limitation level connected to the belt shaft on one side is connected to the profile head firmly locked to the housing via the connecting tube and via the first torsion bar having the high force limitation level. If the belt shaft now continues rotating as a result of the forward displacement when the profile head is locked, only the second torsion bar with the lower force limitation level is consequently twisted. If the higher force limitation level is to be actuated at a preset angle of rotation of the shaft with respect to the fixed profile head, the connecting tube is coupled to the rotation of the belt shaft via the correspondingly provided coupling element. Owing to the coupling of the connecting tube to the belt shaft, both ends of the second torsion bar having the lower force limitation level, are now connected to the belt shaft, so that if the second torsion bar is bridged, the first torsion bar acted upon by the rotation of the belt shaft via the coupling element and the connecting tube, is now twisted with respect to the fixed profile head.

The coupling element configured between the connecting tube and the belt shaft enclosing the latter is formed by a spring element arranged in a recess of the belt shaft; at the beginning of the rotation of the belt shaft, said spring element slides over the surface of the connecting tube with a locking hook configured thereon. The rotational path of the belt shaft provided for the actuation of the high force limiting level is fixed by the arrangement of a locking groove extending in the longitudinal direction of the connecting tube and arranged therein, so that after the passage of the thus preset rotational path of the belt shaft with the coupling element attached thereto, the locking hook of the coupling element drops into the locking groove of the connecting tube, and the belt shaft and the connecting tube are connected to one another by means of the coupling element, which is supported on one side in the recess of the belt shaft, and on the other side to the locking hook in the locking groove of the connecting tube.

The disadvantage of the known belt retractor is that switching the force limiting element from the lower force limiting level to the higher force limiting level has to already take place before reaching a full rotation of the belt shaft because of the separation between the initial position of the locking hook of the coupling element and the position of the locking groove in the connecting tube, which is only possible at the beginning of the force limitation. On the other hand, however, there is also a requirement that performing such switching even later, namely, after more than one rotation of the belt shaft with respect to the locked profile head, is possible.

It is therefore the underlying object of the invention to configure a belt retractor having the features mentioned above, such that switching from the low to the high force limiting level can also be arranged at a later time than a full rotation of the belt shaft with respect to the locked profile head.

SUMMARY AND INTRODUCTORY DESCRIPTION

As is apparent from the description below, above described object is obtained according to the content of this description of embodiments and further developments of the invention.

The principles of the invention provide that, in its initial rotation with respect to the connecting tube, the coupling element is supported on the surface of the connecting tube by means of a bridging device, so that when crossing the locking groove of the connecting tube, the locking hook does not latch into the locking groove, and that the bridging device, upon reaching the preset angle of rotation of the belt shaft, releases the coupling element for latching its locking hook in the locking groove of the connecting tube.

One advantage of the invention is that, during the further rotation of the belt shaft and the coupling element with respect to the connecting tube having the locking groove, the locking hook of the coupling element is held out of engagement with the locking groove by the bridging device, so that now the belt shaft with the coupling element coupled thereon can perform more than one rotation around the connecting tube, without the locking hook of the coupling element dropping into the locking groove of the connecting tube.

A first embodiment of the invention provides that the bridging device consists of at least one spacer arranged between the connecting tube and the coupling element and connected to the coupling element, and that, in order to accommodate the spacer, a recess is arranged in the surface of the coupling tube, on a path that is covered by the spacer upon rotation of the coupling element with respect to the connecting tube. By means of such a spacer, a switching time of up to nearly two turns of the belt shaft or of the coupling element with respect to the connecting tube can be set. Preferentially, the recess arranged in the connecting tube for accommodating the spacer becomes operative after a first passage of the locking hook of the coupling element with respect to the locking groove, so that, upon passage of the locking groove by the locking hook of the coupling element, the spacer prevents the locking hook from dropping into the locking groove of the connecting tube. The recess is then arranged in the connecting tube in the direction of rotation of the coupling element around the connecting tube, such that the spacer drops into the recess, and, during the continuing rotation of the coupling element around the connecting tube, the locking hook of the coupling element lies on the surface of the connecting tube and slides over it until, after another turn of the belt shaft with the coupling element with respect to the connecting tube, the locking hook of the coupling element drops into the correspondingly arranged locking groove of the connecting tube.

In accordance with an exemplary embodiment of the invention, it is provided that the spacer is configured in one piece with the coupling element, and that a predetermined breaking point is formed in the area of the spacer protruding over the surface of the connecting tube when the spacer is in the recess of the connecting tube. Alternatively, it can be provided that the spacer is fixed with a pin-shaped extension projecting away therefrom in an allocated recess of the coupling element, and the pin-shaped extension is designed such that the pin-shaped projection shears off when there is a relative turn between the spacer and the coupling element. In both cases, it must be ensured that the coupling element can continue rotating with respect to the spacer once the spacer has dropped into the recess provided on the connecting tube.

It can conveniently be provided that one spacer is arranged in a symmetrical arrangement on each side of the locking hook configured on the coupling element.

In an alternative embodiment of the invention, it is provided that the bridging device consists, on the one hand, of a catch arranged on one axial end of the coupling element and engaging therein with a helical groove configured on the allocated end of the connecting tube, such that upon a relative rotation of the coupling element with respect to the connecting tube, the coupling element is axially displaced with respect to the connecting tube, and that, in order to optimize the bridging device upon initial rotation of the coupling element with respect to the connecting tube, the locking hook configured on the coupling element axially protrudes over the locking groove configured on the connecting tube, and is supported on the connecting tube, and only drops into the locking groove after an axial displacement of the coupling element effected by the preset angle of rotation of the belt shaft with respect to the connecting tube. With this embodiment, the switching time can be set at nearly any value. Since the coupling element can only engage with the locking groove of the connecting tube after the corresponding axial displacement, the switching time merely depends on the number of passages of the helical groove on the connecting tube and thus on the extent of the thus set axial displacement of the coupling element with respect to the connecting tube, which is necessary for the locking hook of the coupling element to drop into the locking groove of the connecting tube.

In the process, it can be provided that the end of the helical groove is open toward the front side of the connecting tube such that, when the preset angle of rotation of the belt shaft is reached, the catch of the coupling element is released from the groove owing to the axial displacement thereof.

BRIEF DESCRIPTION OF THE DRAWINGS

An exemplary embodiment of the invention is shown in the drawing below, where.

FURTHER DESCRIPTION OF THE INVENTION

Figure 1:
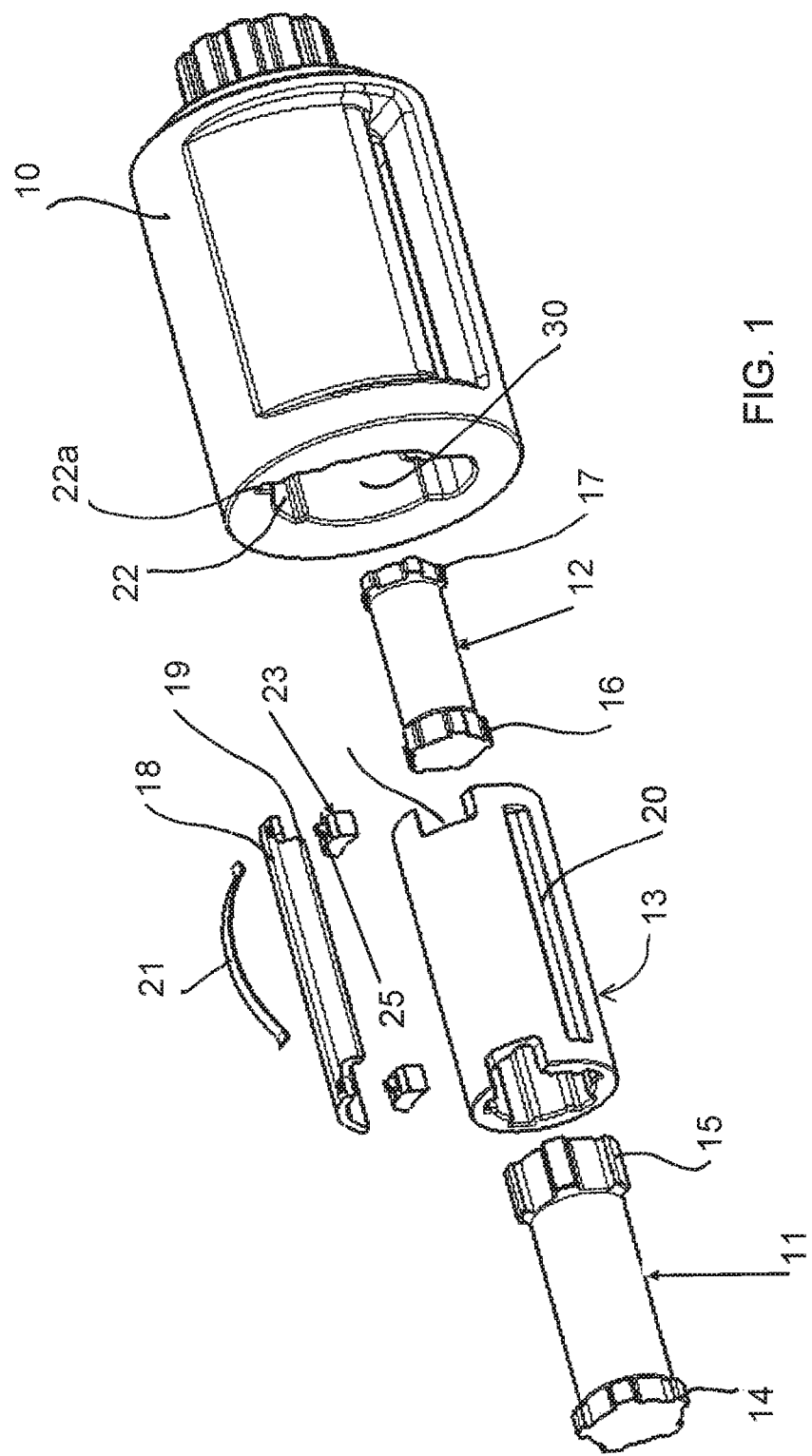
FIG. 1 is an exploded view of the belt shaft of a belt retractor, not shown in more detail, with components of a two-stage force limiting device integrated into the belt shaft.

Will In as much as FIG. 1 shows a belt shaft with a force limiting element integrated therein, its structural design corresponds to the object described in more detail in the generic document DE 10 2009 024 292 A1, the disclosure of document DE 10 2009 024 292 A1 and its content, unless amended within the scope of the description of the present invention, is referred to and also made the object of the present description.

FIG. 1 shows a belt shaft 10, into which a first force limiting element 11 with a higher force limiting level and a second force limiting element 12 with a lower force limiting level are integrated. Both force limiting elements 11 and 12 are each configured as torsion bars with correspondingly profiled ends. The two torsion bars 11 and 12 are inserted in the inside a connecting tube 13, which connecting tube 13 can in turn be inserted into a central opening 30 of the belt shaft 10.

Here, the first force limiting element 11 has a profiled (left) end 14, which is used to connect the first force limiting element 11 to a profile head, which is not shown detail, as the profile head is likewise addressed in form and function in the generic document DE 10 2009 024 292 A1. Owing to an inner profiling of the connecting tube 13, the opposite (right) end 15 of the first force limiting element 11, is fixed in a positive locking manner to the connecting tube 13, and firmly connected thereto in this respect. This also applies to the torsion bar which forms the second force limiting element 12, whose one (left) end 16 likewise is connected in a positive locking manner to the belt shaft 10. Insofar, as described in the generic document, the two ends 14 and 17 of the first force limiting element 11 and of the second force limiting element 12 axially protrude over the connecting tube 13.

A coupling element 18 is arranged between the outer periphery of the connecting tube 13 and the inner periphery of the central opening 30 of the belt shaft 10 for coupling of the connecting tube 13 to the belt shaft 10. Said coupling element 18 is accommodated in the recess 22, which is correspondingly provided in the interior of the belt shaft 10, and is supported therein. The coupling element 18 is pretensioned by means of a spring 21 against the connecting tube 13, wherein the spring 21 is accommodated by a recess 22a adjacent to the recess 22 for the coupling element 18, and thus pretensions the coupling element 18 contacting the connecting tube 13. The coupling element 18, itself likewise configured in a spring-loaded manner, at one radial end has a locking hook 19, which, when the coupling element 18 is in the recess 22 of the belt shaft 10, projects into the inside of the opening 30 and thus contacts the outside surface of the connecting tube 13 in a spring-loaded manner. A locking groove 20 configured on the connecting tube 13 is allocated to the locking hook 19 of the coupling element 18 such that, with a corresponding position of the connecting tube 13 with respect to the locking hook 19 of the coupling element 18, the locking hook 19, engages with the locking groove 20 owing to the spring effect and connects the connecting tube 13 to the coupling element 18 in this engaged position, and thus to the belt shaft 10 consistent with a joint rotation of the two components.

The function of the force limiting element shown in FIG. 1 will be described below with reference to FIGS. 2 to 5. As regards the individual sequences during switching, reference is additionally made to the disclosure of document DE 10 2009 024 292 A1.

Figure 2:
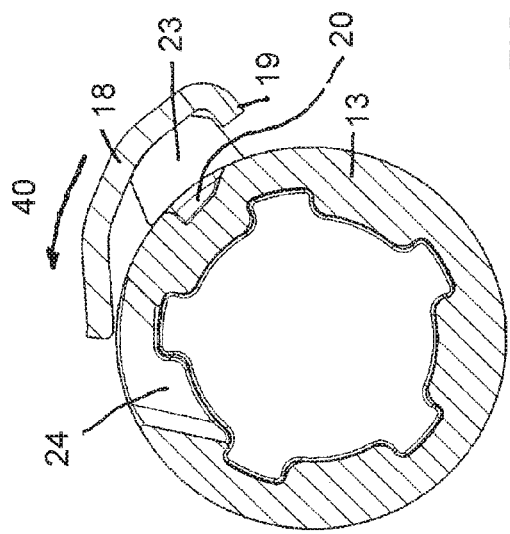
FIG. 2 is a sectional view of the connecting tube of the force limiting element in interaction with the coupling element secured to the belt shaft in the starting position before the beginning of the force limitation.

Insofar as the starting position of the force limiting device is evident from FIG. 2, it can be seen that a spacer 23 is arranged between the coupling element 18 and the surface of the connecting tube 13 holding the coupling element spaced apart, so that the locking hook 19 of the coupling element is held spaced apart from the surface of the connecting tube 13. As already cited in the introduction to the description, at the beginning of the force limiting process, the belt shaft 10 continues rotating counterclockwise with respect to the profile head, not shown in detail (arrow 40 below), wherein the first force limiting element 11 connected by its one end 4 to the profile head stops, so that the connecting tube 13, coupled in a positive locking manner to the other end 15 of the first force limiting element 11, correspondingly stops. This connecting tube 13 thus also fixes the first end 16 of the second force limiting element 12, so that upon further rotation of the belt shaft with the coupled second end 17 of the second force limiting element 12, the second force limiting element 12 configured as a torsion bar is twisted in itself. At the same time, the coupling element 18 fixed in the recess 22 of the belt shaft 10 jointly rotates with the belt shaft in the direction of the arrow 40, as can be seen from a comparison of FIG. 2 with the stage shown in FIG. 3.

Figure 3:
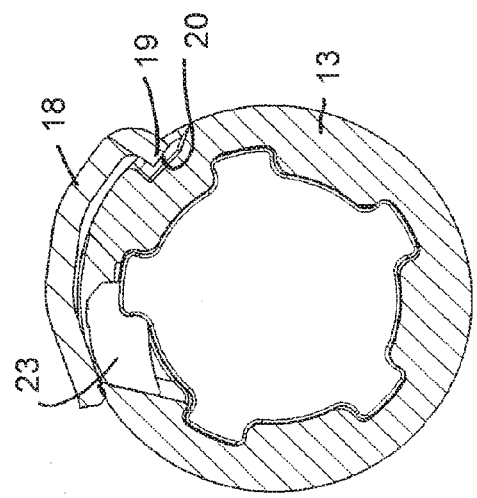
FIG. 3 is the object of FIG. 2 on passage of the locking groove of the connecting tube by the coupling element with locking hook owing to a further rotation of the belt shaft with the coupling element mounted thereon with respect to the connecting tube.
Figure 4:
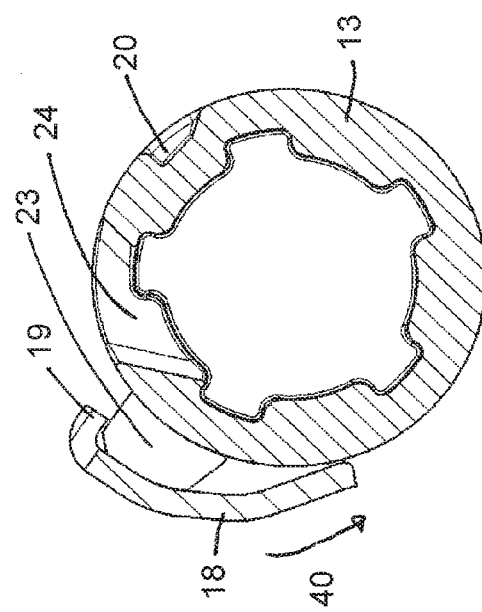
FIG. 4 is the object of FIG. 3 on cancellation of the effect of the inventive bridging device upon further rotation of the belt shaft with coupling element with respect to the connecting tube.

As shown in FIG. 3, the coupling element 18 has completed a 270° rotation with respect to the starting position shown in FIG. 2, wherein, in this position the coupling element 18 passes over the locking groove 20 of the connecting tube 13, without the locking hook 19 of the coupling element 18 being allowed to drop into the locking groove 20 owing to the still acting spacer 23.

According to FIG. 3, on further rotation of the belt shaft 10 with respect to the still stopped connecting tube 13, the spacer 23 reaches a recess 24 configured in the connecting tube 13, so that owing to the spring-loaded impact of the spring 21 on the coupling element 18, the spacer 23 is pressed into the recess 24, and latched therein, such that upon further counterclockwise rotation of the belt shaft 10 (arrow 40), the pin shaped extension 25 of the spacer 23 shears off the coupling element 18. Subsequently, the locking hook 19 of the coupling element 18 lies on the outer periphery of the connecting tube 13, and according to the drawing of FIG. 5, upon continuing rotation of the belt shaft 10 around the still stopped connecting tube 13, the locking hook 19 latches into the locking groove 20 of the connecting tube 13, so that according to the drawing of FIG. 5, the connecting tube 13 is now coupled to the rotary motion of the coupling element 18 and thus to the belt shaft 10.

At this moment, the switch from the low force limiting level, established by the effect of the second force limiting element 12, to the higher force limiting level, defined by the first force limiting element 11, is completed because, owing to the coupling of the connecting tube 13 to the belt shaft 10, the second force limiting element 12 is now bridged because said second force limiting element 12 is connected both by its own (right) end 17 directly to the belt shaft 10 and by its (left) end 16 to the belt shaft 10 via the connecting tube 10 connected to the belt shaft 10, so that a relative rotation of the belt shaft 10 with respect to the end 16 of the second force limiting element 12 no longer occurs. In fact, upon further rotation of the belt shaft 10, a rotation of the (right) end 15 of the first force limiting element 11, which is coupled to the connecting tube 13 occurs, and thus a twisting of the first force limiting element 11 configured as a torsion bar with respect to the (left) end 14 of the first force limiting element 11 fixed on the profile head.

Figure 5:
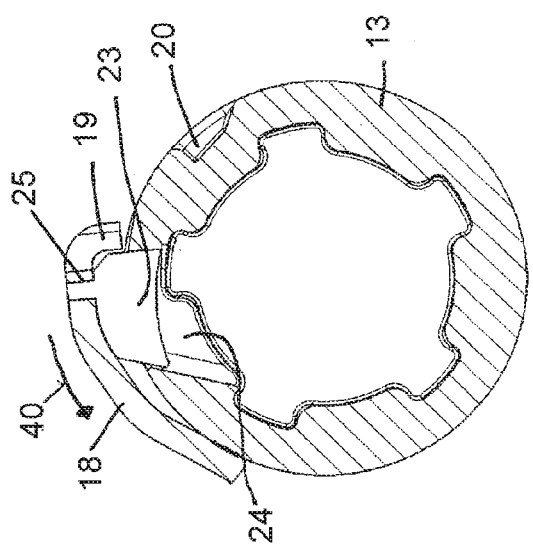
FIG. 5 shows the object of FIG. 4 with the locking hook of the coupling element dropped into the locking groove of the connecting tube.
Figure 6:
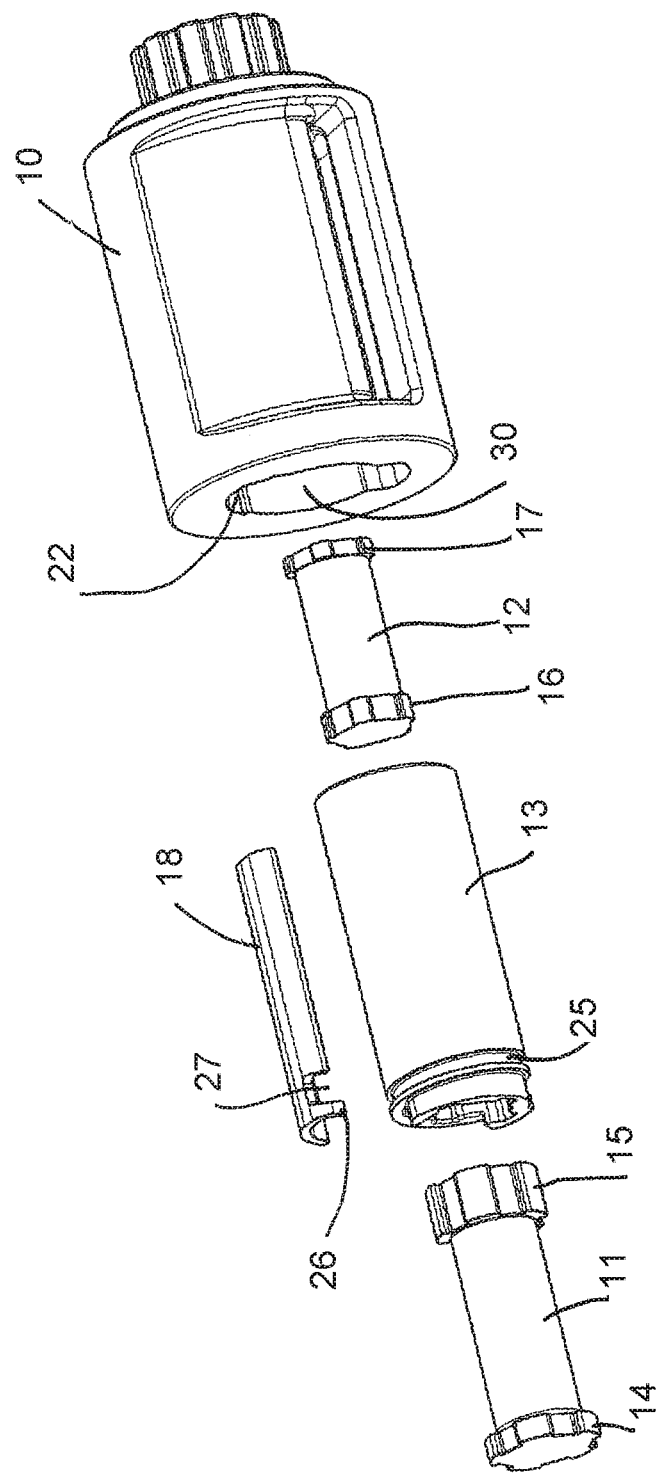
FIG. 6 is another exemplary embodiment of the belt shaft with force limiting element in a view corresponding to FIG. 1.

As can be seen from a comparison of the starting position shown in FIG. 2 and the switching position shown in FIG. 5 of the force limiting device, in the shown exemplary embodiment, switching occurs after around 1¾ rotations of the belt shaft with respect to the locked profile head or left end 14 of the first force limiting element 11.

It is evident that a smaller number of rotations of the belt shaft can be selected for setting the switching time by accordingly displacing the locking groove 20 in the connecting tube 13.

The alternative exemplary embodiment of the invention shown in FIGS. 6 to 9 is different from the exemplary embodiment previously shown in FIGS. 1 to 5 in that the switching time for switching the level of the force limiting device can be displaced even further and in particular designed for more than two rotations of the belt shaft.

To this end, the coupling element 18 with its locking hook 19 can be arranged axially displaceable with respect to the connecting tube 13, so that, in the starting position of the force limitation, the coupling element 18 can lie with one axial end segment on the periphery of the connecting tube 13, and thus the locking hook 19 of the coupling element 18 likewise an not drop into the locking groove 20 of the connecting tube 13 until the locking hook 19 can be aligned with the locking groove 20 by an axial displacement of the coupling element 18 with respect to the connecting tube 13, In order to realize the axial displacement a helical groove 25 with a number of passages corresponding to the desired axial displacement is configured on the end of the connecting tube 13 facing the first force limiting element 11, into which a catch 26, arranged on the allocated end of the coupling element 18 and projecting therefrom in a hook-shaped manner, engages. The groove 25 is open toward the end of the connecting tube, so that the catch 26 is released from the helical groove 25 upon reaching a position of the coupling element 18 that allows an engagement of the locking hook 19 with the locking groove 20. Furthermore, a free segment 27 is configured between the catch 26 and the locking hook 19, so that the radial swiveling movement of the coupling element 18 in the direction of the connecting tube 13 is not impeded by the catch 26.

Figure 7:
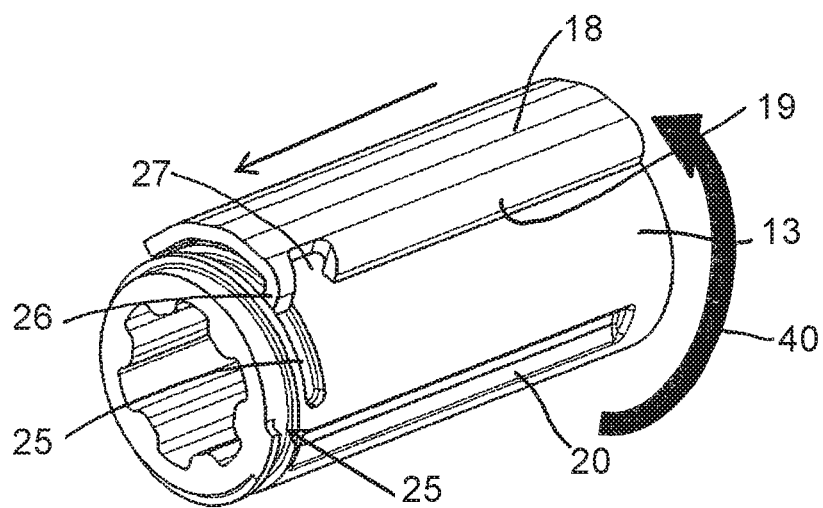
FIG. 7 is a perspective view of the connecting tube in interaction with the coupling element in the starting position before the beginning of the force limitation.
Figure 8:
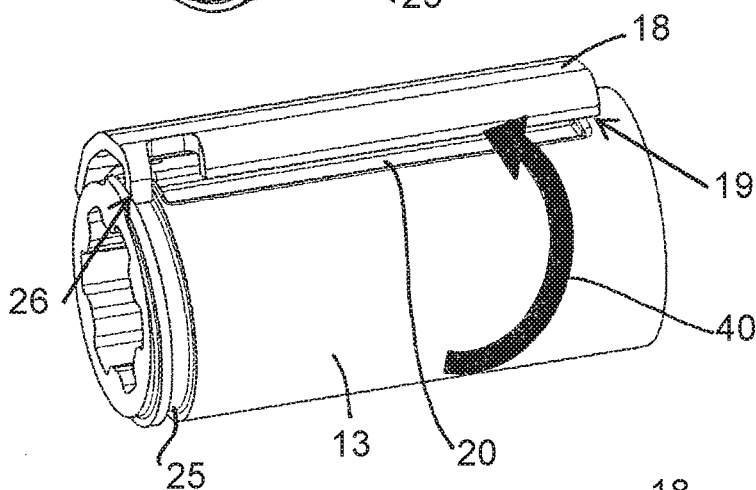
FIG. 8 shows the object of FIG. 7 upon passage of the locking groove by the locking hook of the coupling element without the connecting tube being coupled to the coupling element.
Figure 9:
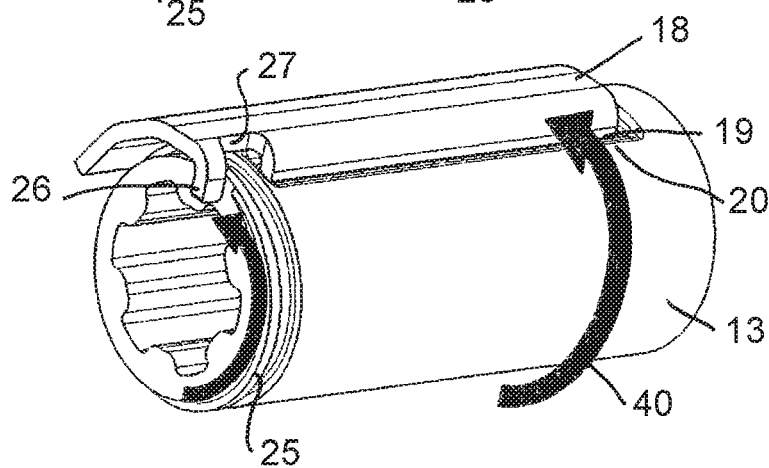
FIG. 9 shows the object of FIG. 7 with the locking hook of the coupling element dropped into the locking groove of the connecting tube.

As can be seen by considering FIGS. 7 to 9, the catch 26 of the coupling element 18 shown in the starting position in FIG. 7 is in the innermost passage of the helical groove 25, so that the opposite end of the locking hook 19 axially protrudes over the locking groove 20, and upon passage of the locking groove, as shown in FIG. 8, prevents a spring-loaded drop of the locking hook 19 into the locking groove 20. Upon relative rotation (arrow 40) of the coupling element 18 coupled to the rotation of the belt shaft 10 with respect to the fixed connecting tube 13, as described specifically with regard to the exemplary embodiment according to FIGS. 1 to 5, an axial displacement of the coupling element 18 on the connecting tube 13 occurs owing to the engagement of the catch 26 with the helical groove 25 of the connecting tube 13, until, the locking hook 19 latches into the locking groove 20 in the position shown in FIG. 9. In this position, the catch 26 is released from the helical groove 25 that is open at the end, and does not impede the radial swiveling motion of the locking hook 19; at the same time, the free segment 27 ensures the corresponding freedom of movement.

While the above description constitutes the preferred embodiment of the present invention, it will be appreciated that the invention is susceptible to modification, variation and change without departing from the proper scope and fair meaning of the accompanying claims.

The invention claimed is:

1. A belt retractor for a seat belt of a motor vehicle, the retractor of a type having a belt shaft rotatably mounted in a housing and with a profile head coupled to the belt shaft and lockable with respect to the housing, comprising a force limiting device having first and second force limiting elements arranged between the profile head and the belt shaft to allow a force limited rotation of the belt shaft in the direction of the belt extension when the profile head is locked and when a force limiting level preset by the force limiting device is exceeded, and the first force limiting element is connected by a first end thereof to the profile head, and the second force limiting element is connected by a first end thereof to the belt shaft, and wherein second ends of the first force limiting element and of the second force limiting element are coupled to one another by means of a connecting tube, for coupling of the connecting tube to the belt shaft, a coupling element is provided via which the connecting tube can be coupled therewith at a preset angle of rotation of the belt shaft, and wherein furthermore the coupling element arranged between the belt shaft and the connecting tube is configured as a hook-shaped spring element with a locking hook, which, upon rotation of the belt shaft including the coupling element, slides over the outer periphery of the connecting tube, which, after reaching the preset angle of rotation of the belt shaft drops into a locking groove configured on the periphery of the connecting tube, and thus couples the connecting tube to the belt shaft during initial rotation coupling element with respect to the connecting tube, the coupling element is supported on the surface of the connecting tube by means of a bridging device, and thus the locking hook, when passing over the locking groove of the connecting tube, is kept out of engagement with the locking groove, and that, when the preset angle of rotation of the belt shaft is reached, the bridging device releases the coupling element in order for the locking hook to latch with the locking groove of the connecting tube.

2. The belt retractor according to claim 1, in that the bridging device comprises a spacer arranged between the connecting tube and the coupling element and connected to the coupling element, and that in the surface of the connecting tube, a recess is arranged in the path passed over by the spacer upon rotation of the coupling element with respect to the connecting tube in order to accommodate the spacer.

3. The belt retractor according to claim 2, further comprising in that the spacer is configured in one piece with the coupling element and that a predetermined breaking point is configured in the area of the spacer protruding over the surface of the connecting tube when the spacer is in the recess of the connecting tube.

4. The belt retractor according to claim 2, further comprising in that the spacer having a pin-shaped extension projecting therefrom is fixed in an allocated recess of the coupling element, and that the pin-shaped extension shears off upon the relative rotation between the spacer and the coupling element.

5. A belt retractor according to claim 2, further comprising in that the spacer is arranged symmetrically on both sides of the locking hook configured on the coupling element.

6. The belt retractor according to claim 1, further comprising in that the bridging device forms a catch arranged on an axial end of the coupling element, which engages with a helical groove configured on an end of the connecting tube, such that, upon a relative rotation of the coupling element with respect to the connecting tube, the coupling element is axially displaced with respect to the connecting tube, and the locking hook configured on the coupling element, axially protrudes over the locking groove configured on the connecting tube upon the initial rotation of the coupling element with respect to the connecting tube, and is supported on the connecting tube, and only drops into the locking groove after an axial displacement of the coupling element with respect to the connecting tube by the preset angle of rotation of the belt shaft.

7. The belt retractor according to claim 6, further comprising in that that the end of the helical groove is open toward a front side of the connecting tube such that the catch of the coupling element is released from the groove by means of the axial displacement thereof after reaching the preset angle of rotation of the belt shaft.

8. The belt retractor according to claim 1, further comprising the first force limiting element having a higher force limiting level than the second force limiting element.

9. The belt retractor according to claim 1, further comprising the first and second force limiting elements in the form of first and second torsion bars.

10. The belt retractor according to claim 1, further comprising the first and second force limiting elements arranged inside the interior cavity formed by the connecting tube.

\* \* \* \* \*